United States Patent
Choi et al.

(10) Patent No.: US 9,560,605 B2
(45) Date of Patent: Jan. 31, 2017

(54) METHOD FOR CONFIGURING DOWNLINK TRANSMISSION POWER THROUGH RRH IN CLOUD LAN ENVIRONMENT

(71) Applicant: LG ELECTRONICS INC., Seoul (KR)

(72) Inventors: Hyeyoung Choi, Seoul (KR); Heejeong Cho, Seoul (KR); Jaehoon Chung, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/029,505

(22) PCT Filed: Oct. 6, 2014

(86) PCT No.: PCT/KR2014/009383
§ 371 (c)(1),
(2) Date: Apr. 14, 2016

(87) PCT Pub. No.: WO2015/060562
PCT Pub. Date: Apr. 30, 2015

(65) Prior Publication Data
US 2016/0270006 A1    Sep. 15, 2016

Related U.S. Application Data

(60) Provisional application No. 61/894,918, filed on Oct. 24, 2013.

(51) Int. Cl.
*H04W 52/36* (2009.01)
*H04W 24/10* (2009.01)
*H04W 16/32* (2009.01)
*H04W 52/14* (2009.01)
*H04W 72/04* (2009.01)

(52) U.S. Cl.
CPC ........... *H04W 52/365* (2013.01); *H04W 16/32* (2013.01); *H04W 24/10* (2013.01); *H04W 52/143* (2013.01); *H04W 72/042* (2013.01)

(58) Field of Classification Search
CPC ............................. H04W 52/365; H04W 24/10
USPC ........................................... 455/522, 69, 509
See application file for complete search history.

(56) References Cited

U.S. PATENT DOCUMENTS

| 2012/0087247 | A1 | 4/2012 | Min et al. | |
| 2012/0106477 | A1* | 5/2012 | Kwon | H04W 52/365 370/329 |
| 2012/0207112 | A1* | 8/2012 | Kim | H04W 52/146 370/329 |

(Continued)

FOREIGN PATENT DOCUMENTS

| KR | 10-2012-0036449 A | 4/2012 |
| KR | 10-2012-0096408 A | 8/2012 |

(Continued)

*Primary Examiner* — John J Lee
(74) *Attorney, Agent, or Firm* — Birch, Stewart, Kolasch & Birch, LLP (57) ABSTRACT

Disclosed are a BBU power configuring method and a BBU which determine required power which is requested by a BBU to an RRH to transmit a downlink signal to a terminal based on RRH power headroom information in a cloud LAN environment in which the RRH and the BBU are separated and transmit a power allocation change request message for making a request for changing transmission power of other BBUs connected to the RRH to the other BBUs.

16 Claims, 8 Drawing Sheets

(56) References Cited

U.S. PATENT DOCUMENTS

2013/0223350 A1    8/2013  Kang et al.
2013/0272158 A1   10/2013  Park et al.
2015/0201386 A1*   7/2015  Kimura ............... H04W 52/245
                                                    455/522

FOREIGN PATENT DOCUMENTS

KR    10-2013-0066686 A    6/2013
KR    10-2013-0097586 A    9/2013

* cited by examiner

METHOD FOR CONFIGURING DOWNLINK TRANSMISSION POWER THROUGH RRH IN CLOUD LAN ENVIRONMENT

CROSS REFERENCE TO RELATED APPLICATIONS

This application is the National Phase of PCT International Application No. PCT/KR2014/009383, filed on Oct. 6, 2014, which claims priority under 35 U.S.C. 119(e) to U.S. Provisional Application No. 61/894,918, filed on Oct. 24, 2013, which is hereby expressly incorporated by reference into the present application.

TECHNICAL FIELD

The present invention relates to technology related to a method and device for configuring downlink transmission power through an RRH in a heterogeneous environment where a macro cell and a small cell coexist.

BACKGROUND ART

A radio access network (RAN) configuration has been changed such that various types of small cells such as a pico cell and a femto cell interact with a macro cell. The RAN configuration refers to a heterogeneous cell configuration or a hierarchical cell configuration in which small cells for low power/near field communication coexist in addition to an existing macro cell-based homogeneous network. An object of a new RAN configuration is to increase QoE (Quality of Experience) by providing a high data transfer rate to an end user.

In a complicated urban environment, it is inefficient to install an additional macro cell base station as in conventional cases. This is because system throughput is not significantly improved compared to increase of cost and complexity for installation of an additional macro cell due to a shadow area of the communication environment. Thereby, in a new heterogeneous cell structure, multiple small cells coexist in a macro cell, and are assigned resources according to a cell coordination scheme to serve UEs. Such heterogeneous cell structure is intended to provide a high data transmission rate for end users to enhance Quality of Experience (QoE).

In small cell enhancements for E-UTRA and E-UTRAN study item (SI) as one of 3rd generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conducted to draw advantages of concept of dual connectivity to small cell layers and a macro cell layer in which a user uses the same or different carriers.

DISCLOSURE

Technical Problem

An object of the present invention devised to solve the problem lies in smoothly transmitting downlink data by adjusting transmit power of an RRH in a heterogeneous network environment wherein the RRH is separated from BBUs.

Another object of the present invention is to efficiently configure downlink transmit power in a heterogeneous network environment by taking into account power allocated to other BBUs connected to the RRH in configuring the transmit power of RRH.

Another object of the present invention is to dynamically adjust downlink transmit power by configuring a required power in consideration of transmission headroom of the RRH.

Objects of the present invention are not limited to the aforementioned objects, and other objects of the present invention which are not mentioned above will become apparent to those having ordinary skill in the art upon examination of the following description.

Technical Solution

To solve the problem above, a method of adjusting transmit power of an RRH by a BBU is proposed hereinbelow. Specifically, proposed herein is a method of adjusting downlink transmit power to a UE by a BBU in consideration of power information about the RRH in a cloud RAN environment.

Advantageous Effects

According to embodiments of the present measure, the following effects may be expected from the present invention.

First, as downlink transmit power is efficiently configured in the heterogeneous network environment wherein an RRH is separated from a BBU, downlink communication may be smoothly performed.

Second, as a relationship between an RRH and other BBUs connected thereto is taken into consideration in configuring downlink transmit power of the RRH, communication may be performed smoothly without collision between the BBUs disposed in the heterogeneous network environment.

Third, as power headroom of an RRH is taken into consideration in configuring a required power, downlink power configuration may be dynamically performed according to the condition of the RRH and a relationship between the RRH and other BBUs.

It will be appreciated by persons skilled in the art that that the effects that can be achieved through the embodiments of the present invention are not limited to those described above and other advantages of the present invention will be more clearly understood from the following detailed description. That is, unintended effects according to implementation of the present invention may be derived by persons skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements. In the drawings.

BEST MODE

The object of the present invention can be achieved by providing a method for configuring a downlink transmit power by a Base Band Unit (BBU) via a Remote Radio Head (RRH) in a cloud RAN (C-RAN) environment having RRH and the BBU separated from each other, the method including determining, based on RRH power headroom information acquired from an entity managing a system capacity of the RRH, a required power which the BBU will make a request to the RRH to transmit a downlink signal to a terminal, and transmitting, to one or more other BBUs connected to the RRH, a power allocation change request message for requesting that the one or more other BBUs change a transmit power allocated to the RRH according to the required power.

The method may further include receiving a power allocation change response message from the one or more other BBUs for the power allocation change request message, and adjusting the determined required power based on the power allocation change response message.

The power allocation change response message may contain at least one of information about whether the one or more other BBUs adjust the power, information about an adjusted power value and information about a cause disallowing adjustment of the power.

The method may further include transmitting, to the one or more other BBUs, a power allocation change command message for designating new power according to the adjusted required power.

The downlink transmit power is configured when a power allocation change command response message indicating that the adjusting of the required power has been completed is received from all the one or more other BBUs in response to the power allocation change command message.

The method may further include transmitting an RRH information request message to the entity, and receiving, from the entity, an RRH information response message containing the RRH power headroom information.

The transmitting includes configuring a timer of a predetermined time interval according to transmission of the power allocation change request message, the method further including retransmitting, when the power allocation change response message is not received until the timer expires, the power allocation change request message.

The power allocation change request message and the power allocation change response message may be transmitted and received via an X2 interface with the one or more other BBUs.

In another aspect of the present invention, provided herein is a Base Band Unit (BBU) for configuring a downlink transmit power via a Remote Radio Head (RRH) in a cloud RAN (C-RAN) environment having RRH and the BBU separated from each other, the BBU including a transmitter, a receiver, and a processor configured connected to the transmitter and receiver to configure the downlink transmit power, wherein the processor is configured to determine, based on RRH power headroom information acquired from an entity managing a system capacity of the RRH, a required power which the BBU will make a request to the RRH to transmit a downlink signal to a terminal, and control the transmitter to transmit, to one or more other BBUs connected to the RRH, a power allocation change request message for requesting that the one or more other BBUs change a transmit power allocated to the RRH according to the required power.

Mode for Invention

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Environment

Figure 1:
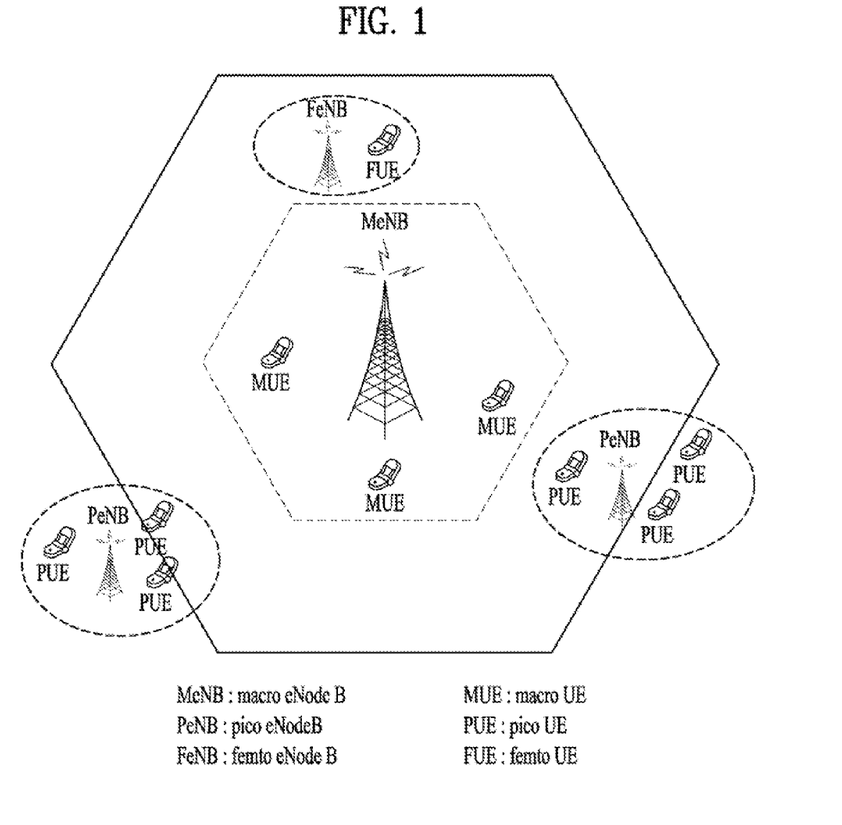
FIG. 1 is a diagram illustrating a heterogeneous network environment related to the present invention.

FIG. 1 is a diagram for a heterogeneous network environment associated with one embodiment of the present invention.

To guarantee a more stable data service such as multimedia service in future-generation mobile communication, much attention has been attracted to a hierarchical cell structure or heterogeneous cell structure in which small cells (e.g., pico cells or femto cells) for low power/near field communication are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each of a plurality of the small cells serves corresponding UEs by resource allocation based on a cell coordination scheme. As one of core technologies for implementing the aforementioned heterogeneous network environment, it may be able to separately implement an RRU (remote radio unit) and a BBU (baseband unit).

2. Cloud RAN Environment in which RRU and BBU are Separated from Each Other

Figure 2:
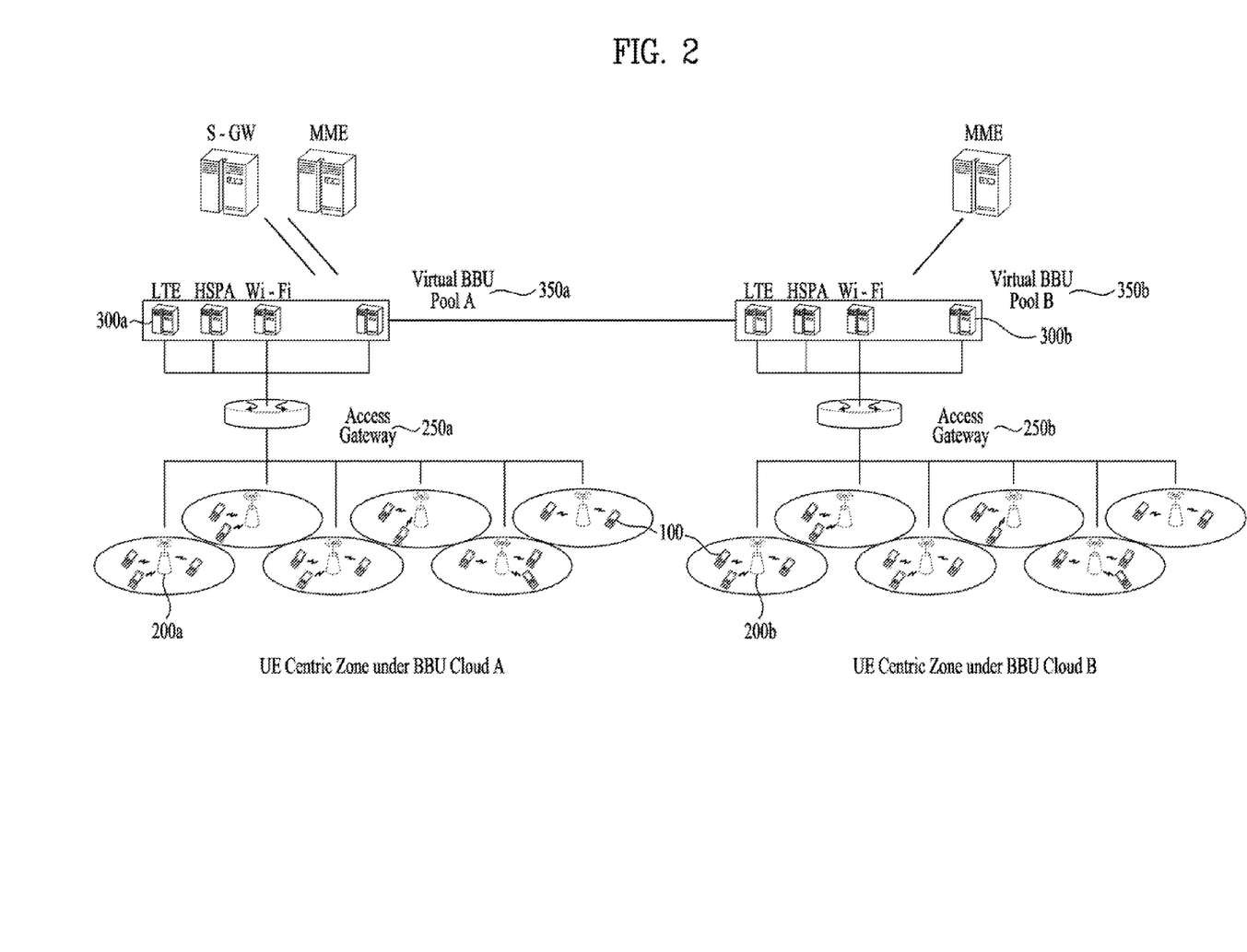
FIG. 2 is a diagram illustrating a cloud RAN environment related to the present invention.

FIG. 2 is a diagram for a cloud RAN (C-RAN) environment associated with one embodiment of the present invention. The cloud RAN environment can consist of a plurality of RRUs 200a/200b, a software-based virtual BBU pool 350a/350b or a virtual base station (VBS) and an access control/resource management/authentication server controlling the same and the like. Since elements of a core network change into an open IP network in the cloud RAN environment, many elements of the cloud RAN are directly interlocked with the elements of the core network in an organic relation.

Meanwhile, as an example of implementing the cloud RAN environment, as mentioned in the foregoing description, there may exist environment in which RRUs 200a/200b and BBUs 300a/300b are separated from each other. According to the separation of the RRUs and the BBUs, it may be able to compose cloud RAN environment including characteristics described in the following.

Firstly, a virtual BBU pool 350a/350b exists and includes a plurality of BBUs 300a/300b. The virtual BBU pool 350a/350b has a structure of being associated with SAS (shared antenna system) RRUs 200a/200b supporting Multi-RAT (multi-radio access technology) through an access gateway 250a/250b. The virtual BBU pool 350a/350b includes a plurality of BBUs 300a/300b supporting various wireless access technologies and one RRU 200a/200b can be associated with one or more BBUs 300a/300b. On the contrary, one BBU 300a/300b can be associated with one or more RRUs 200a/200b. BBUs 300a/300b belonging to the virtual BBU pool 350a/350b can be connected with the RRUs 200a/200b via an ideal/non-ideal backhaul and one virtual BBU pool 350a can be connected with another virtual BBU pool 350b via X2 interface or an interface similar to the X2 interface.

Secondly, all RRUs 200a/200b belonging to the virtual BBU pool 350a/350b have an identical virtual cell ID and all BBUs 300a/300b and all RRUs 200a/200b belonging to the virtual BBU pool 350a/350b are connected with each other via an ideal backhaul. An RRU 200a/200b is controlled by a BBU 300a/300b associated with the RRU.

Thirdly, a synchronization signal used for obtaining downlink synchronization is transmitted by each of the RRUs 200a/200b and the synchronization signal can be transmitted in a manner of including not only a virtual cell ID capable of representing the virtual BBU pool 350a/350b to which the RRUs 200a/200b belong thereto but also an RRU ID capable of representing each of the RRUs 200a/200b.

Fourthly, each of the RRUs 200a/200b assumes a simple antenna and L1/L2/L3 layer processing is processed by the BBUs 300a/300b belonging to the virtual BBU pool 350a/350b. And, the RRUs 200a/200b may have an attribute of SAS and it indicates that the RRUs 200a/200b may belong to another BBU from one BBU in the virtual BBU pool 350a/350b. In particular, time-variable belonging of the RRUs 200a/200b may change from one BBU to another BBU according to a situation (e.g., load of the BBUs, an available resource status, etc.) of the BBUs 300a/300b.

According to a legacy technology, there exists a physical cell and users receive a service by accessing the cell. Yet, as mentioned in the foregoing description, when an RRU and a BBU are implemented in a manner of being separated from each other, a network configures a zone capable of providing optimized communication environment in a user unit and provides a user with a zone-based service.

3. Downlink Power Allocation Method for RRH

Figure 3:
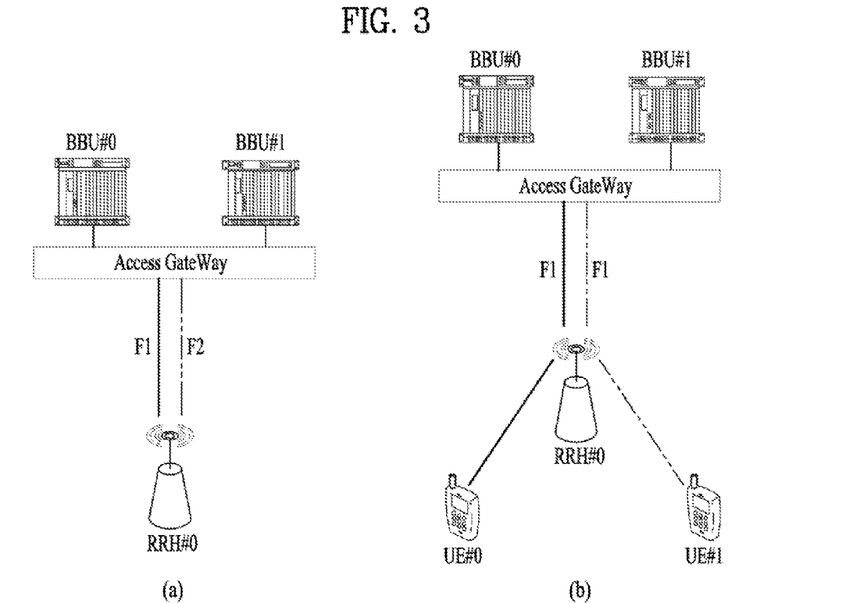
FIG. 3 illustrates a procedure of one or more BBUs transmitting data through an RRH in relation to the present invention.

FIG. 3 illustrates a procedure of one or more BBUs transmitting data through an RRH in relation to the present invention.

In LTE-Rel 9/10/11, an eNB may transmit a reference signal power of each carrier and the value of $P_B$ through the PDSCH-Configuration field of System Information Block 2 (SIB2) in order to allocate transmit power to a UE. In addition, the value of $P_A$ is transmitted through an RRC signal. For the legacy eNB, the sum of maximum transmit powers of antenna connectors is limited not to exceed the maximum transmit power of the eNB. In addition, when carrier aggregation (CA) is performed by the eNB, powers of carriers aggregated by the eNB are allocated. Accordingly, the sum of transmit powers of the respective carriers may be adjusted not to exceed the maximum transmit power of the eNB. Such adjustment may be coordinated using reference signal powers of $P_A$ and $P_B$ mentioned above.

Meanwhile, in a cloud RAN environment where an RRH is separated from BBUs, the mapping relationship between the BBUs and the RRH changes dynamically. If such mapping relationship is allocated UE-specifically, coverage proper for a specific UE may be configured. Such cloud RAN environment may have various mapping relationships between the BBUs and the RRH.

From the perspective of the RRH, one BBU may transmit data via a specific RRH. In this case, the transmit power of the data may be adjusted not to exceed the maximum transmit power of the RRH using the DL power allocation method used in legacy LTE.

Alternatively, a plurality of BBUs may transmit data via a specific RRH. In this case, various methods may be used for multiple BBUs to transmit data via one RRH. Specifically, multiple BBUs may transmit data using different carriers or the same carrier.

For example, as shown in FIG. 3(a), when BBU #0 and BBU #1 transmit data via RRH #0, the BBUs may use different carriers. That is, BBU #0 may transmit data using carrier F1, and BBU #1 may transmit data using carrier F2. In this case, the sum of transmit powers transmitted through the two carriers F1 and F2 becomes the sum of DL powers transmitted by RRH #0. Accordingly, by adjusting the maximum values of the transmit powers of the two carriers, the sum of the DL powers of the RRH may be adjusted not to exceed the maximum transmit power that the RRH can transmit.

As another example, as shown in FIG. 3(b), BBU #0 and BBU #1 may transmit data via RRH #0 using the same carrier F1. When BBU #0 and BBU #1 exchange information about scheduling, the two BBUs may divide the same carrier F1 into RB units (or RB groups) on behalf of different UEs (UE #0 and UE #1). For example, BBU #0 may schedule RB #0 and RB #1 on carrier F1 on behalf of UE #0, and BBU #1 may schedule RB #2 and RB #3 on carrier F1 on behalf of UE #1.

Figure 4:
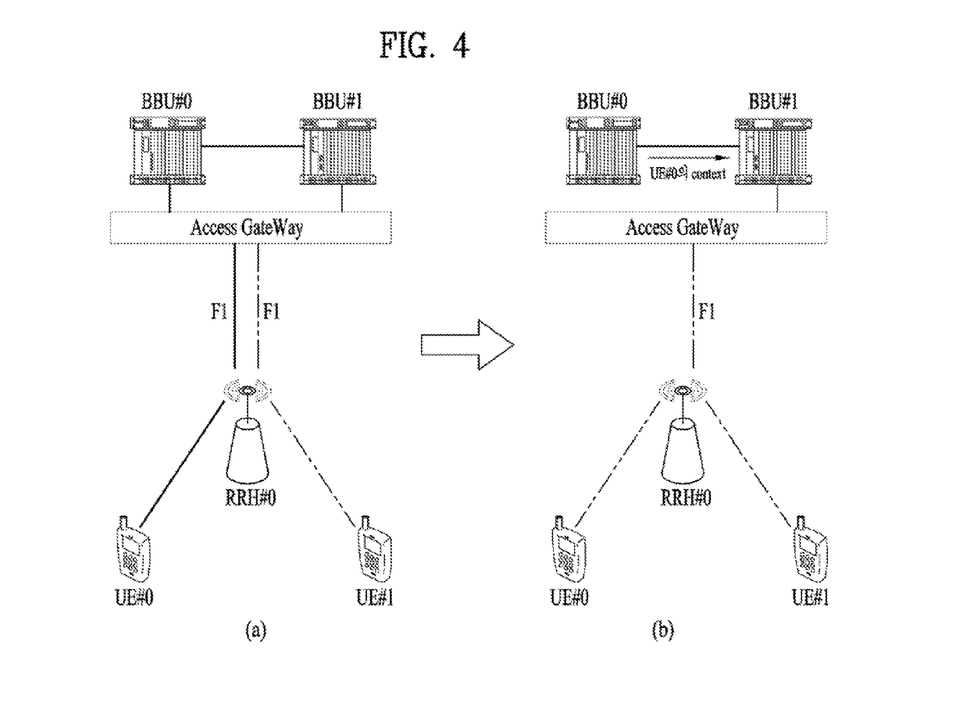
FIG. 4 illustrates a procedure of one or more BBUs transmitting data via an RRH in relation to the present invention.

FIG. 4 illustrates a procedure of one or more BBUs transmitting data via an RRH in relation to the present invention.

FIG. 4 illustrates another environment wherein the example illustrated in FIG. 3(b) is utilized. For example, in the example illustrated in FIG. 4(a), BBU #0 may manage context information about UE #0, and BBU #1 may manage context information about UE #1. In this case, the mapping relationship between the BBUs and an RRH may not change dynamically, or the mapping relationship may not be UE-specifically configured. In this case, BBU #0 needs to perform a procedure of handing over information about UE #0 to BBU #1 to transmit data to UE #0 via RRH #0, as shown in FIG. 4(b). This procedure may be similar to the conventional handover procedure and may degrade system performance.

However, in a cloud RAN environment wherein the RRH is separated from the BBUs, BBU #0 may use carrier F1 of RRH #0 without performing BBU switching (or handover) according to the aforementioned method. That is, the mapping relationship between BBUs and the RRH may change dynamically, and be configured UE-specifically. Therefore, BBU #0 is capable of supporting UE #0 without performing BBU switching or the handover procedure.

In such cloud RAN environment, the maximum power is limited for each RRH, in contrast with the legacy LTE Rel-9/10/11. In addition, since a BBU generates data and determines scheduling for transmission of the data, the BBU may determine the transmit power of the data. In addition, as the determined transmit power is transmitted via an interface between the BBU and the RRH (e.g., common public radio interface (CPRI)), data transmit power of the RRH may be adjusted.

As an object (RRH) for which the maximum power is limited differs from an object (BBU) that determines power of data and the mapping relationship between the RRH and the BBU is dynamically changeable, issues that need to be addressed from a new perspective are raised. For example, when a BBU determines power of data transmitted via a specific RRH, the BBU may not recognize the values of power determined for other BBUs which transmit data via the RRH. Accordingly, transmit power of the RRH determined for other BBUs may exceed the maximum transmit power of the RRH. To address this issue, a power allocation method considering maximum power per RRH is needed.

If a BBU is additionally connected to a specific RRH, or connection to the specific RRH is released, power allocation adjustment in carrier units is required. In this case, carriers may support single-RAT (radio access technology) or multi-RAT.

If the maximum transmit power per carrier is determined through power allocation adjustment in carrier units via a specific RRH, coordination between BBUs using the same carrier is required. That is, parameter values such as the maximum transmit power that the BBUs can transmit need to be determined and changed. In the case of the example of FIG. 3(b), BBU #0 and BBU #1 transmit data via specific RRH #0 using carrier F1. Thereby, data transmit powers of BBU #0 and BBU #1 need to be adjusted such that the sum of the data transmit powers of the BBUs does not exceed the maximum transmit power of the RRH.

In a cloud RAN environment wherein an RRH is separated from BBUs, a BBU connected to a specific RRH may coordinate the power allocation of the RRH using various methods. For example, the power that the BBU requests when connected to the RRH may or may not affect the transmit powers of other BBUs which transmit data via the RRH. If the requested power affects the transmit powers of other BBUs, various subjects such as a BBU, A-GW and a separate entity may adjust the transmit powers of BBUs connected to the RRH, the DL power allocation procedure may be differently implemented in the respective cases.

Hereinafter, a description will be given of various embodiments of a DL power allocation method for an RRH in a cloud RAN environment wherein the RRH is separated from BBUs.

Figure 5:
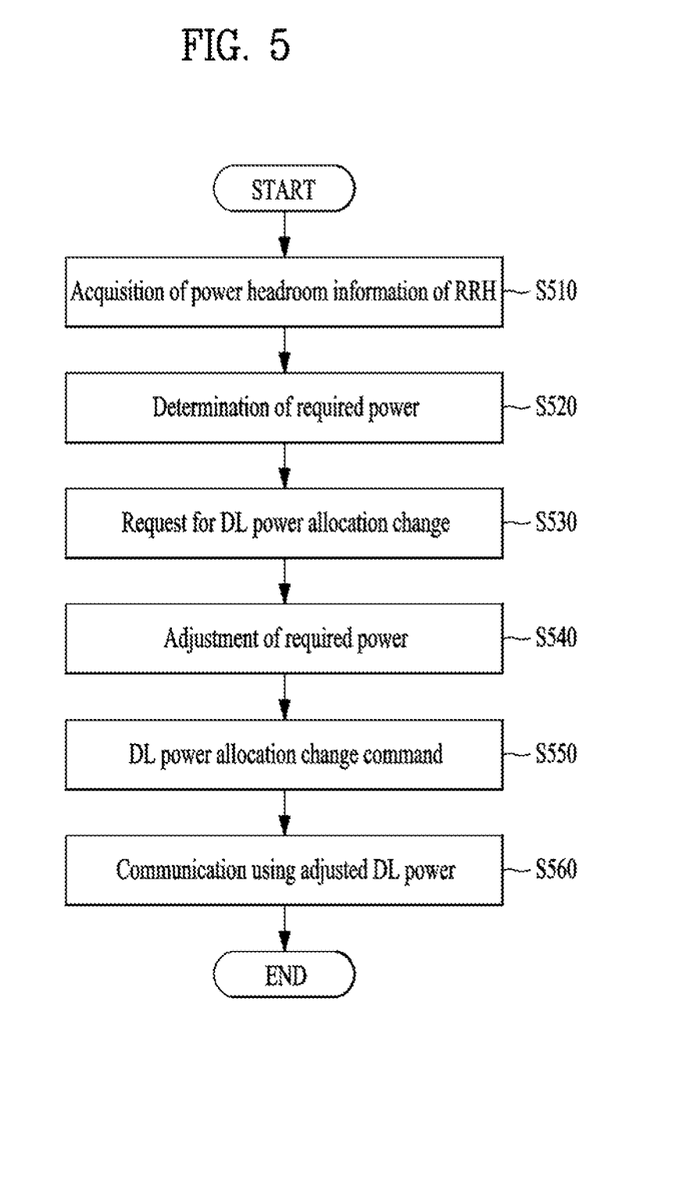
FIG. 5 illustrates a power allocation method according to an embodiment of the present invention.

FIG. 5 illustrates a power allocation method according to an embodiment of the present invention. There is no restriction on RAT of carriers described below. That is, the carriers may support the same RAT or different RATs.

First, a BBU acquires information about a specific RRH before being connected to the RRH. The BBU may generate an RRH information request message for acquiring information about the RRH, and transmit the same to a server/entity/A-GW which manages information about the RRH. The RRH information request message may contain at least one of a field for information about capacities of the RRH (e.g., the maximum transmit power of the RRH, RRH supporting RAT, an RRH supporting frequency, power headroom of the RRH (a difference between the maximum transmit power of the RRH and the current transmit power), the number of antenna chains, etc.), a field for mapping information about the RRH (RRH ID, BBU ID mapped to the RRH, frequency information about the BBU, transmit power of the BBU, etc.), a field for BBU ID, a field for RRH ID and a field for the server/entity/A-GW IP.

Upon receiving the RRH information request message, the server/entity/A-GW transmits an RRH information response message to the BBU to provide the information requested by the BBU. The BBU may acquire information about the power headroom of the RRH from the RRH information response message (S510).

Upon acquiring the RRH information, the BBU determines a required power that the BBU requests the RRH to allocate for transmission of a DL signal in consideration of the power headroom information about the RRH (S520). The required power may be determined as a certain range or a specific value. In addition, the required power may be determined within the power headroom of the RRH or determined as a value exceeding the range of the power headroom of the RRH.

In the procedure of connecting to the RRH, the BBU transmits a DL power allocation change request message requesting allocation of the required power to the RRH, other BBUs connected to the RRH, or the server and/entity/A-GW (S530). The target to which the DL power allocation change request message is transmitted will be specifically described below with reference to FIGS. 6 to 8.

Subsequently, the BBU may receive a DL power allocation change response message in response from a target object that receives the DL power allocation change request message and adjust the determined required power (S540). For example, if not all the predetermined required power is allocatable due to other BBUs connected to the RRH, the BBU desiring to add connection to the RRH may lower the required power. Alternatively, if the power required by the BBU connected to the RRH does not affect the powers allocated to the other BBUs, the BBU may maintain the required power rather than adjusting the required power.

Subsequently, the BBU transmits a DL power allocation change command message requesting the adjusted required power (S550). The BBU may transmit the DL power allocation change command message to a target object that has transmitted the DL power allocation change request message. Upon receiving the DL power allocation change command message, the RRH, another BBU, or server/entity/A-GW may adjust and set the DL power for the RRH based on the information contained in the message.

Subsequently, the BBU performs DL communication via the RRH using the adjusted DL power (S560).

Figure 6:
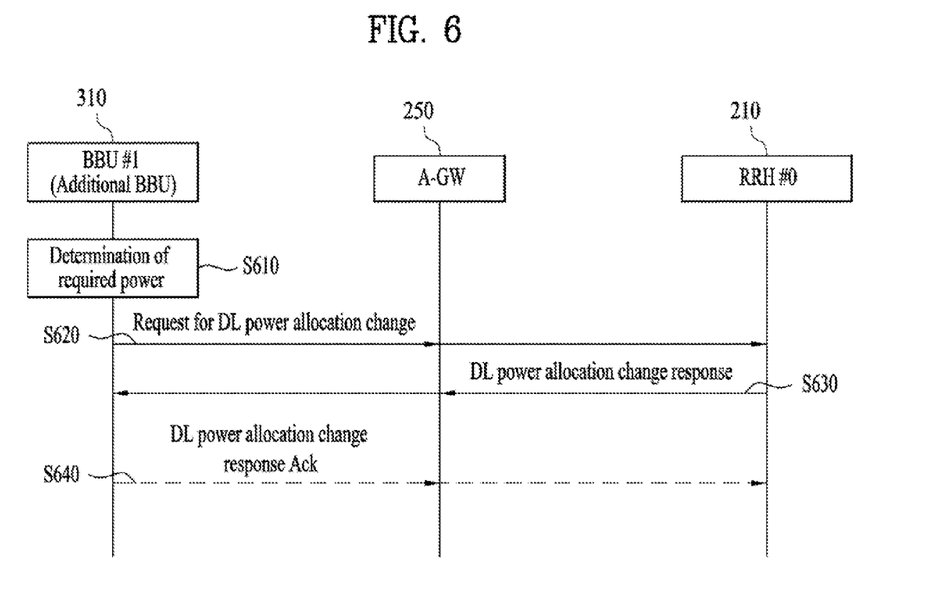
FIG. 6 illustrates a power allocation method according to another embodiment of the present invention.

FIG. 6 illustrates a power allocation method according to another embodiment of the present invention. In the embodiment illustrated in FIG. 6, the required power that BBU #1 310 determines when connected to RRH #0 210 does not affect other BBUs connected to RRH #0 210. For example, the required power determined by BBU #1 310 may be lower than the power headroom of RRH #0 210.

BBU #1 310 desiring to be connected to RRH #0 210 determines a required power which BBU #1 310 desires to be allocated (S610). As described above, the required power may be determined taking into consideration information about RRH #0 210 received from an A-GW 250. The required power may be a specific value or a value indicating a certain range.

The BBU #1 310 transmits a DL power allocation change request message containing information about the determined required power to RRH #0 210 via the A-GW 250 (S620). The DL power allocation change request message may contain at least one of a field indicating the message type, a field for BBU ID (source), a field for RRH ID (destination), a field for A-GW IP, a field for an indicator indicating whether to adjust powers of other BBUs, and fields for {the frequency of a carrier that the BBU desires to use, a power value (or range) of a carrier required by the BBU, and a carrier power change indicator for the BBU} or {the frequency of a carrier that the BBU desires to use, a carrier power change indicator for the BBU, and Cause}.

Upon receiving the DL power allocation change request message, RRH #0 210 may recognize BBU #1 310 desiring to be connected to RRH #0 210, the required power of BBU #1 310, whether adjustment of powers of other BBUs connected to RRH #0 210 is requested, and the like. For example, if the indicator indicating whether to adjust powers of other BBUs is set to 1, this may mean that a request for adjustment of powers of other BBUs has been made to RRH #0 210. If the indicator is set to 0, this may mean that adjustment of powers of other BBUs is not needed. As another example, if a carrier power change indicator of the BBU is set to 10, which is 2 bits, this may mean that a request for increasing power per carrier has been made to RRH #0 210. If the indicator is set to 01, this may mean that a request for decreasing power per carrier has been made. If the indicator is set to 00, this may mean that a request for maintaining power per carrier has been made.

RRH #0 210 transmits a DL power allocation change response message to BBU #1 310 via the A-GW 250 in consideration of the request from the BBU #1 310 (S630). The DL power allocation change response message may contain an indicator indicating whether the required power of BBU #1 310 exceeds the power headroom of RRH #0 210, and may also contain information about the power headroom of RRH #0 210. For example, the DL power allocation change response message may contain at least one of a field indicating the message type, a field for RRH ID (source), a field for BBU ID (destination), a field for an indicator indicating whether the power exceeds the power headroom of RRH, a field for the power headroom of the RRH and the field for A-GW IP.

For example, if the indicator indicating whether the required power exceeds the power headroom is set to 1, this may mean that the required power of BBU #1 310 exceeds the power headroom of RRH #0 210. If the indicator is set to 0, this may mean that the required power does not exceed the power headroom.

Upon receiving the DL power allocation change response message from RRH #0 210, the BBU #1 310 may recognize whether the required power thereof exceeds the power headroom of RRH #0 210. If the required power does not exceed the power headroom, the BBU #1 310 may configure the required power requested by the BBU #1 310 as a power for a carrier. On the other hand, if the required power exceeds the power headroom, the BBU #1 310 may configure power for carriers by reducing the required power.

Subsequently, BBU #1 310 transmits, to RRH #0 210, a DL power allocation change response Ack message indicating that the DL power has been configured. (S640). The DL power allocation change response Ack message may be transmitted via the A-GW 250. Meanwhile, BBU #1 310 and RRH #0 210 may set a timer of a predetermined time interval in order to retransmit the message thereof if the response message and/or the Ack message is not transmitted.

As described above, when BBU #1 310 reduces the required power to configure a new required power, BBU #1 310 may configure a new DL power allocation change request message and transmit the same, rather than transmitting an Ack message.

Figure 7:
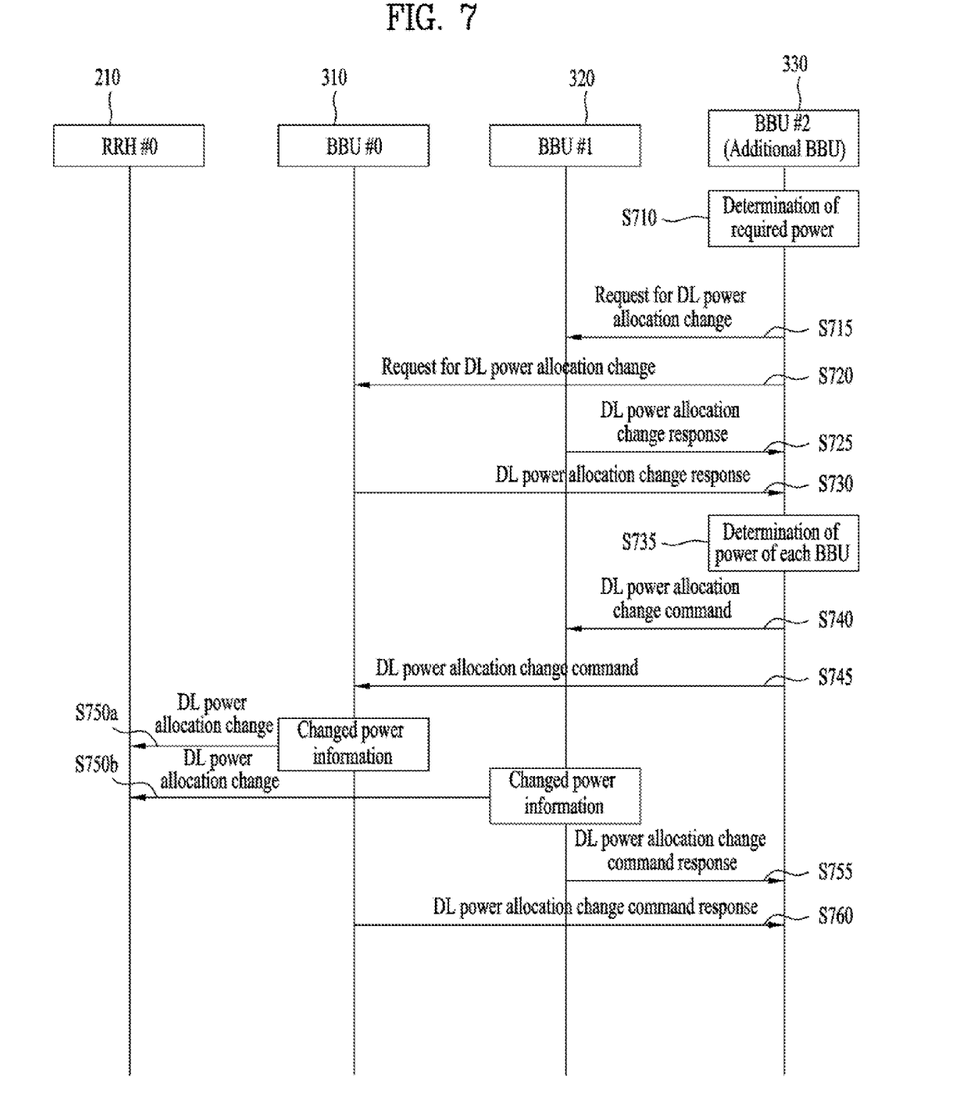
FIG. 7 illustrates a power allocation method according to another embodiment of the present invention.
Figure 8:
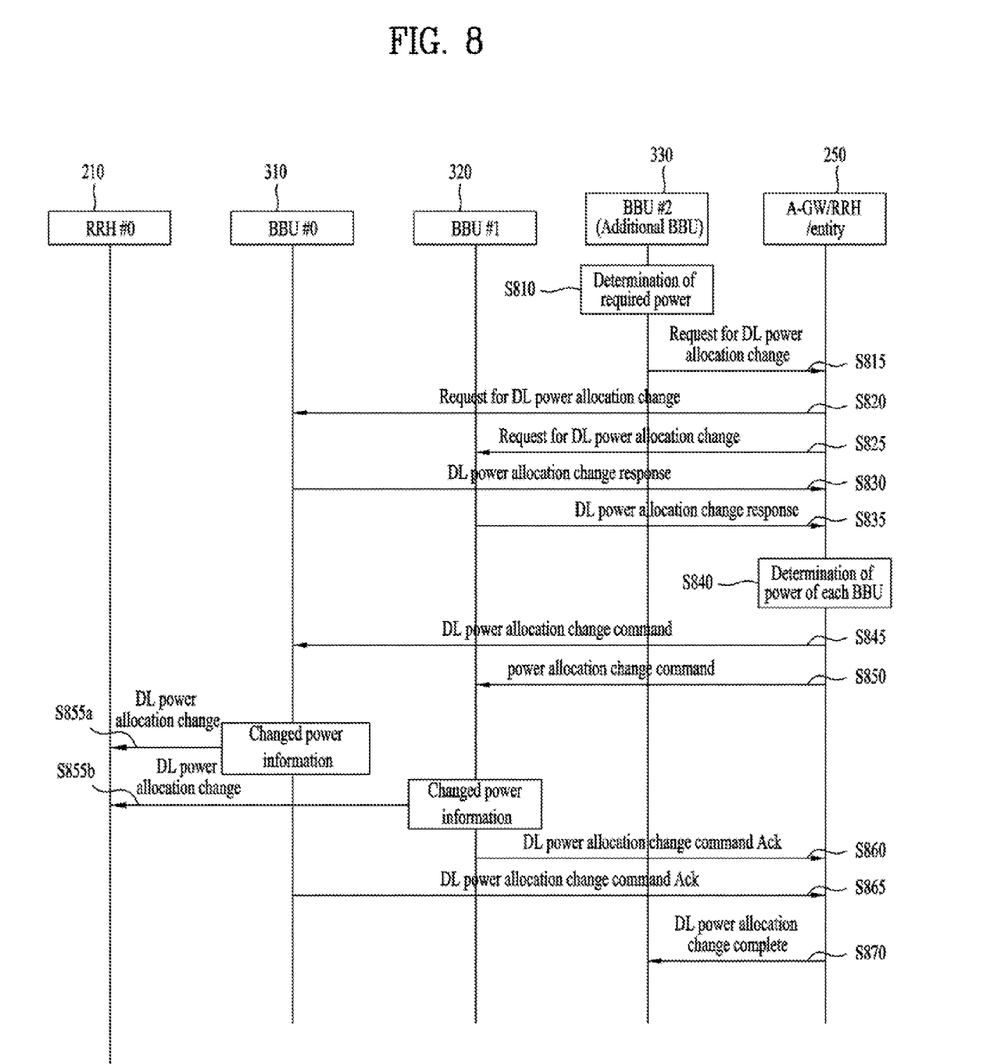
FIG. 8 illustrates a power allocation method according to another embodiment of the present invention.

FIGS. 7 and 8 illustrate a power allocation method according to another embodiment of the present invention. In the embodiment illustrated in FIGS. 7 and 8, the required power determined by the BBU #2 330 connected to RRH #0 210 affects other BBUs such as BBU #0 310 and BBU #1 320 which are connected to RRH #0 210. For example, the required power of BBU #2 330 may be higher than the power headroom of RRH #0 210. FIG. 7 illustrates a case where a BBU (BBU #2 333) determines DL powers for other BBUs.

In the embodiment illustrated in the FIG. 7, BBU #2 330 determines a required power based on the information related to the capacity of RRH #0 210 (S710). BBU #2 330 may collect information about capacity of RRH #0 210 and the headroom via the A-GW or the like, and pre-recognize information about BBU #0 310 and BBU #1 320 connected to RRH #0 210. BBU #2 330 may predetermine the required power by taking into consideration the information about the power headroom of RRH #0 210 and other BBUs.

Subsequently, BBU #2 330 transmits, to BBU #0 310 and BBU #1 320, information about power per carrier (required power for carriers that BBU #2 330 intends to use through a DL power allocation change request message (S715, S720). The DL power allocation request change request message may contain at least one of a field indicating the message type, a field for BBU ID (source), a field for BBU ID (destination), a field for RRH ID, and fields for {the frequency of a carrier that the BBU #2 330 desires to use, a power value (or range) of a carrier required by the BBU, and a carrier power change indicator for the BBU} or {the frequency of a carrier that the BBU desires to use, a carrier power change indicator for the BBU, and Cause}. In addition, the message may be transmitted via an X2 interface or X2-like interface arranged between the BBUs.

Upon receiving the DL power allocation change request message, BBU #0 310 and the B #1 320 determine whether to adjust the power per carrier thereof. That is, the BBU #0 310 and BBU #1 320 may compare the frequency of a carrier and power per carrier to use to transmit data thereof with the frequency of the carrier and power per carrier which are requested by BBU #2 330. BBU #0 310 and BBU #1 320 may determine power per carrier to set for BBU #2 330 according to the result of comparison.

Subsequently, BBU #0 310 and BBU #1 320 transmit, to BBU #2 330, information indicating whether to adjust the power per carrier, the power determined to be set and the like.

After receiving the DL power allocation change response message, BBU #2 330 may determine whether to increase/maintain/decrease power per carrier of each of BBU #0 310 and BBU #1 320, taking into consideration whether to adjust the powers of BBU #0 310 and BBU #1 320 and the values to which the powers can be set. Alternatively, the BBU #2 330 may specifically determine the value of power per carrier for each of the BBUs. In addition, BBU #2 330 may re-determine the required power thereof (S735).

Subsequently, BBU#2 330 transmits information about the new adjusted required power to BBU #0 310 and BBU #1 320 through a DL power allocation change command message (S740, S745). The DL power allocation change command message may contain at least one of a field indicating the message type, a field for BBU ID (source), a field for BBU ID (destination), a field for RRH ID (destination) and fields for {carrier frequencies of BBUs #0 and #1, power values of the carriers adjustable by BBU #2, and carrier power change indicators for BBUs #0 and #1} or {carrier frequencies of BBUs #0 and #1, carrier power change indicators for BBUs #0 and #1, and Cause}.

Upon receiving the power allocation change command message, BBU #0 310 and BBU #1 320 change the DL transmit powers for the carriers thereof. BBU #0 310 and BBU #1 320 with changed DL transmit powers may transmit information about the changed powers to RRH #0 210 (S750a, S750b).

If the BBUs change DL power allocation for the carriers by changing the reference signal power and PB value of a specific carrier, system information is changed. Accordingly, BBUs having changed DL transmit powers may announce that DL power allocation has been changed using "SystemInfoModification" included in a paging message. Alternatively, if the value of a PA, which is a UE-specific parameter, is changed, the BBUs may inform the UEs of the changed value using an RSS signal. In addition, the BBUs may inform the UEs of the changed values of the reference signal power and PB through a system information block (SIB).

Subsequently, BBU #0 310 and BBU #1 320 having completed DL power change transmits a DL power allocation change command Ack message to BBU #2 330 (S755, S760). The DL power allocation change command Ack message may include the message type, BBU ID (source), BBU ID (destination), and RRH ID, and be transmitted through the X2 interface.

As BBU #2 330 receives the DL power allocation change command Ack messages from all BBUs, BBU #2 330 may recognize that power adjustment for the BBUs has been completed. Subsequently, BBU #2 330 may adjust the DL transmit power thereof to the new required power adjusted in step S735 and transmit data.

FIG. 8 illustrates a power allocation method according to another embodiment of the present invention. FIG. 8 illustrates an exemplary case wherein an A-GW/separate RRH/entity 250 determines the DL powers for the respective BBUs. In FIG. 8, a detailed description of elements illustrated in FIG. 7 will be omitted.

BBU #2 330 desiring to add new connection to RRH #0 210 determines the required power thereof (S810). Subsequently, BBU #2 330 may transmit a DL power allocation change request message to the A-GW/entity/RRH 250 (S815). The RRH receiving the DL power allocation change request message may be RRH #0 210 or another RRH. The DL power allocation change request message may be configured in a manner similar to or the same as configuration illustrated in FIG. 7.

Upon receiving the DL power allocation change request message, the A-GW/entity/RRH 250 relays the same to BBU #0 310 and BBU #1 320 connected to RRH #0 210 (S820, S825). Subsequently, the A-GW/entity/RRH 250 receives, from BBU #0 310 and BBU #1 320, a DL power allocation change response message containing information about the frequencies of carriers in use, whether to adjust the power per carrier, information about the adjusted power values, and the like (S830, S835).

The A-GW/entity/RRH 250 determines the values of power per carrier for BBU #0 310, BBU #1 320 and BBU #333 based on the received information (S840). The A-GW/entity/RRH 250 may increase/decrease/maintain the powers per carrier for BBU #0 310, BBU #1 320 and BBU #333, and adjust the required power of the BBU #2 330.

The A-GW/entity/RRH 250 transmits a DL power allocation change command message containing information about adjusted power values to BBU #0 310 and BBU #1 320 (S845, S850). The DL power allocation change command message may be transmitted only to BBUs for which it is determined to adjust power among the BBUs connected to RRH #0 210.

Upon receiving the DL power allocation change command message, BBU #0 310 and BBU #1 320 change power per carrier based on the received message. The information about the changed power may be transmitted to RRH #0 210. As the procedure of BBUs transmitting information about the changed power values to the UE and RRH #0 210, the procedure illustrated in FIG. 7 may be used (S855a, S855b).

Once power adjustment is completed, BBU #0 310 and BBU #1 320 transmit a DL power allocation change command Ack message to the A-GW/entity/RRH 250 (S860, S865). The A-GW/entity/RRH 250 may recognize, from the Ack message, that power adjustment of the BBUs has been completed, and transmits a DL power allocation change complete message to BBU #2 330 (S870). The DL power allocation change complete message may be delivered in a manner that the DL power allocation change command message is delivered. Alternatively, the DL power allocation change complete message may be delivered in a manner that the A-GW/entity/RRH 250 transmits a DL power allocation change command message to BBU #2 330 to allocate DL power.

BBU #2 330 may determine DL transmit power based on the received DL power allocation change complete message and transmit data via RRH #0 210.

A procedure of connecting a new BBU to an RRH has been described above with reference to FIGS. 5 to 8. The procedure described above may be similarly applied to a case where connection of a specific BBU to the RRH is released, and the various messages described above may be utilized in the same or similar form.

4. Configuration of Apparatuses

Figure 9:
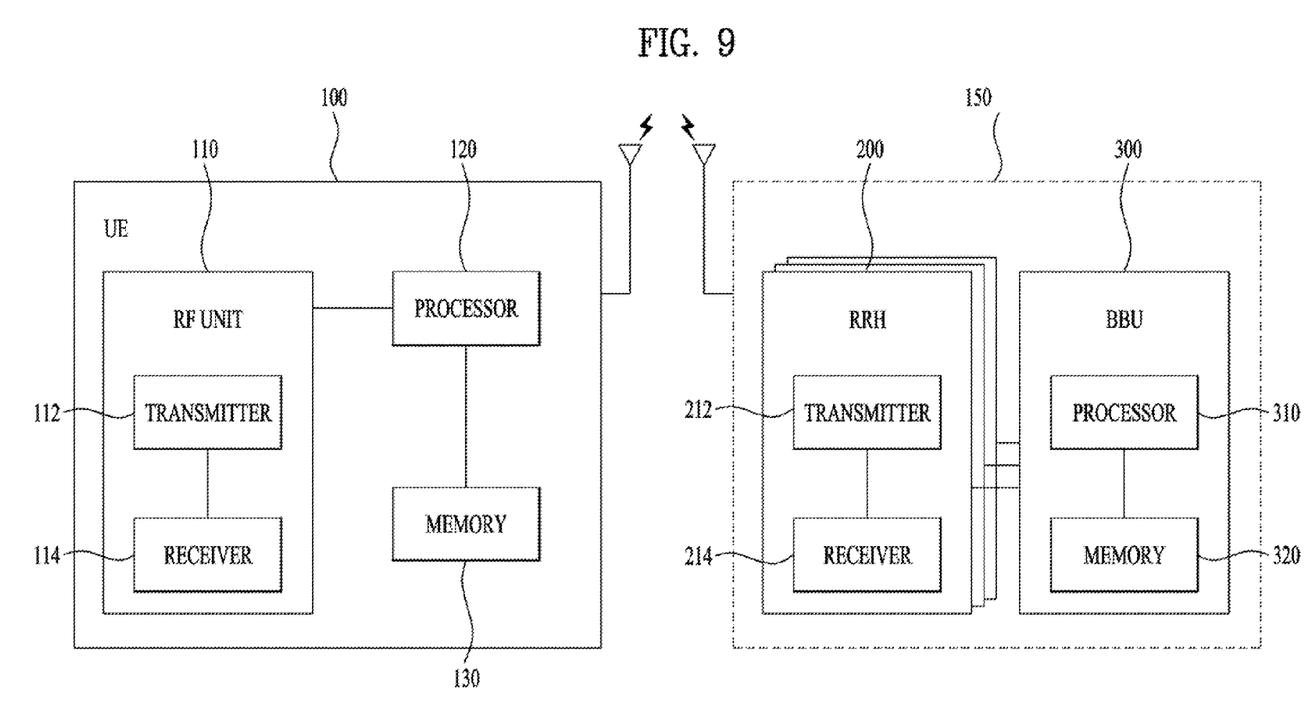
FIG. 9 is a block diagram illustrating configuration of a UE, an RRH and a BBU according to an embodiment of the present invention.

FIG. 9 is a block diagram illustrating configuration of a UE, an RRH and a BBU according to an embodiment of the present invention. While FIG. 9 illustrates a one-to-one communication environment between the UE 100 and the RRH 200, an environment in which multiple UEs and RRHs communicate with each other may also be created.

In FIG. 9, the UE 100 may include a radio frequency (RF) unit 110, a processor 120, and a memory 130. A conventional eNB 150 is implemented to include a transmitter 212, a receiver 214, a processor 310, and a memory 320. On the other hand, in a cloud RAN environment according to an embodiment of the present invention, the elements included in the eNB 150 are divided into the RRH 200 and the BBU 300.

Thereby, the RRH 200 serving as a simple antenna has only the transmitter 212 and the receiver 214. Overall communication operations including signal processing and layer processing are controlled by the processors 310 and the memory 320 included in the BBU 300. In addition, various types of connection including 1:1, 1:N, M:1 and M:N (M and N being natural numbers) may be established between the RRH 200 and the BBU 300.

The RF unit 110 included in the UE 100 may include a transmitter 112 and a receiver 114. The transmitter 112 and the receiver 114 are configured to transmit and receive signals to and from the RRH 200. The processor 120 may be functionally connected to the transmitter 112 and the receiver 114 to control a procedure in which the transmitter 112 and the receiver 114 transmit and receive signals to and from the RRH 200 and other devices. In addition, the processor 120 may apply various processing operations on a signal to be transmitted and then transmit the signal to the transmitter 112, and may process a signal received by the receiver 114.

When necessary, the processor 120 may store information contained in an exchanged message in the memory 130. The UE 100 configured as above may implement the methods of the various embodiments of the present invention described above.

The transmitter 212 and the receiver 214 of the RRH 200 are configured to transmit and receive signals to and from the UE 100. In addition, the processor 310 of the BBU 300 connected to the RRH 200 may be functionally connected to the transmitter 212 and the receiver 214 of the RRH 200 to control a procedure in which the transmitter 212 and the receiver 214 transmit and receive signals to and from other devices. In addition, the processor 310 may apply various processing operations on a signal to be transmitted and then transmit the signal to the transmitter 212, and may process a signal received by the receiver 214. When necessary, the processor 310 may store information contained in an exchanged message in the memory 320. The RRH 200 and the BBU 300 configured as above may implement the methods of the various embodiments described above.

The processors 120 and 310 of the UE 100 and the BBU 300 instruct (e.g., control, adjust, manage, and the like) operations in the UE 100, the RRH 200 and the BBU 300. The processors 120 and 310 may be connected to the corresponding memories 130 and 320 for storing program code and data. The memories 130 and 320 may be connected to the processors 120 and 310 and store an operating system, applications and general files.

The BBU 300 is connected with other BBUs to form a virtual BBU pool. Thereby, although not explicitly shown the figure, the BBU 300 may include a transceive module for connecting to other BBUs, separately from the RRH 200.

The processors 120 and 310 of the present invention may be referred to as controllers, microcontrollers, microprocessors, microcomputers, or the like. The processors 120 and 310 may be implemented by hardware, firmware, software, or a combination thereof. If an embodiment of the present invention is implemented using hardware, the processors 120 and 310 may be provided with ASICs (application specific integrated circuits) or DSPs (digital signal processors), DSPDs (digital signal processing devices), PLDs (programmable logic devices), and FPGAs (field programmable gate arrays) which are configured to implement the present invention.

The methods described above may be written as programs executable in a computer and implemented in general-purpose digital computers that execute the programs using a computer readable medium. In addition, the structure of the data used in the methods described above may be recorded in a computer readable medium using various means. Program storage devices storing executable computer code for implementing the various methods of the present invention should not be understood as including temporary objects such as carrier waves and signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for configuring a downlink transmit power by a Base Band Unit (BBU) via a Remote Radio Head (RRH) in a Cloud-Radio Access Network (C-RAN) environment having the RRH and the BBU separated from each other, the method comprising:
   determining, based on power headroom information acquired from an entity managing a system capacity of the RRH, a required power which the BBU will make a request to the RRH to transmit a downlink signal to a terminal; and
   transmitting, to one or more other BBUs connected to the RRH, a power allocation change request message for requesting that the one or more other BBUs change a transmit power allocated to the RRH according to the required power.

2. The method according to claim 1, further comprising:
   receiving a power allocation change response message from the one or more other BBUs for the power allocation change request message; and
   adjusting the determined required power based on the power allocation change response message.

3. The method according to claim 2, wherein the power allocation change response message contains at least one of information about whether the one or more other BBUs adjust the power, information about an adjusted power value and information about a cause disallowing adjustment of the power.

4. The method according to claim 2, further comprising:
   transmitting, to the one or more other BBUs, a power allocation change command message for designating new power according to the adjusted required power.

5. The method according to claim 4, wherein the downlink transmit power is configured when a power allocation change command response message indicating that the adjusting of the required power has been completed is received from all the one or more other BBUs in response to the power allocation change command message.

6. The method according to claim 1, further comprising:
   transmitting an RRH information request message to the entity; and
   receiving, from the entity, an RRH information response message containing the RR-14 power headroom information.

7. The method according to claim 1, wherein the transmitting comprises:
   configuring a timer of a predetermined time interval according to transmission of the power allocation change request message,
   the method further comprising:
   retransmitting, when the power allocation change response message is not received until the timer expires, the power allocation change request message.

8. The method according to claim 1, wherein the power allocation change request message and the power allocation change response message are transmitted and received via an X2 interface with the one or more other BBUs.

9. A Base Band Unit (BBU) for configuring a downlink transmit power via a Remote Radio Head (RRH) in a Cloud-Radio Access Network (C-RAN) environment having the RRH and the BBU separated from each other, the BBU comprising:
   a transmitter;
   a receiver; and
   a processor connected to the transmitter and the receiver to configure the downlink transmit power,
   wherein the processor is configured to:
      determine, based on power headroom information acquired from an entity managing a system capacity of the RRH, a required power which the BBU will make a request to the RRH to transmit a downlink signal to a terminal; and
      control the transmitter to transmit, to one or more other BBUs connected to the RRH, a power allocation change request message for requesting that the one or more other BBUs change a transmit power allocated to the RRH according to the required power.

10. The BBU according to claim 9, wherein the processor is configured to:
    control the receiver to receive a power allocation change response message from the one or more other BBUs for the power allocation change request message; and
    adjust the determined required power based on the power allocation change response message.

11. The BBU according to claim 10, wherein the power allocation change response message contains at least one of information about whether the one or more other BBUs adjust the power, information about an adjusted power value and information about a cause disallowing adjustment of the power.

12. The BBU according to claim 10, wherein the processor is configured to control the transmitter to transmit, to the one or more other BBUs, a power allocation change command message for designating new power according to the adjusted required power.

13. The BBU according to claim 12, wherein the processor configures the downlink transmit power when a power allocation change command response message indicating that the adjusting of the required power has been completed is received from all the one or more other BBUs in response to the power allocation change command message.

14. The BBU according to claim 9, wherein the processor is configured to:
    transmit an RRH information request message to the entity; and
    control the receiver to receive, from the entity, an RRH information response message containing the power headroom information.

15. The BBU according to claim 9, wherein the processor is configured to:
    configure a timer of a predetermined time interval according to transmission of the power allocation change request message, and
    control the transmitter to retransmit, when the power allocation change response message is not received until the timer expires, the power allocation change request message.

16. The BBU according to claim 9, wherein the power allocation change request message and the power allocation change response message are transmitted and received via an X2 interface with the one or more other BBUs.

\* \* \* \* \*